(No Model.)

F. C. GRAVES.
PRINTER'S QUOIN.

No. 335,282. Patented Feb. 2, 1886.

Witnesses:
Frank H. Pierpont
John Johnston

Inventor:
Francis C. Graves
by Albert H. Walker Atty

United States Patent Office.

FRANCIS C. GRAVES, OF HARTFORD, CONNECTICUT.

PRINTER'S QUOIN.

SPECIFICATION forming part of Letters Patent No. 335,282, dated February 2, 1886.

Application filed October 10, 1885. Serial No. 179,515. (No model.)

*To all whom it may concern:*

Be it known that I, FRANCIS C. GRAVES, of Hartford, Connecticut, have invented a new and useful Printer's Quoin, of which the following description and claims constitute the specification, and which is illustrated by the accompanying sheet of drawings.

This invention consists, mainly, in a wedge and a screw so combined that the screw operates substantially at right angles to that side of the wedge most distant from the head of the screw.

Figure 1:
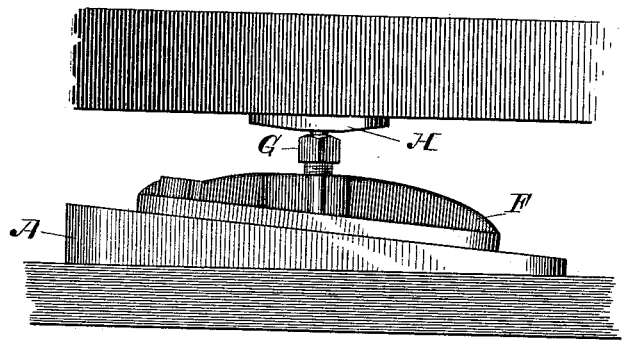
Figure 2:
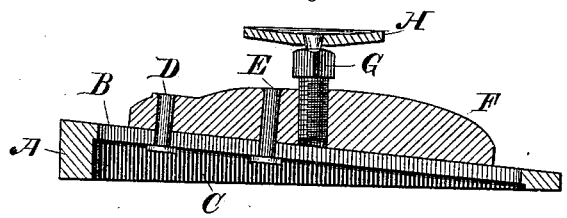
Figure 3:
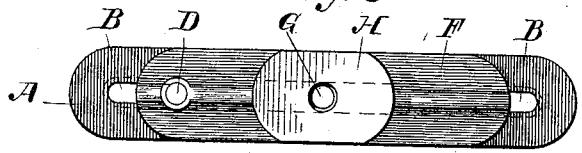

Figure 1 represents my quoin fixed in place between the rail of the form in which the type is locked and the block which is interposed between that type and the quoin. Fig. 2 is a central longitudinal section of my quoin, and Fig. 3 is a plan view of the same.

The wedge A is provided with the slot B and the recess C, for the reception of the necks and heads, respectively, of the projections D and E, which projections are rigidly fixed to the plate F. The screw G works in a threaded recess in the plate F, at a right angle to that side of the wedge A which is most distant from the head of the screw and at an oblique angle to the base of the plate F. The plate A is attached to the screw above the head thereof and revolves thereon.

The mode of operation is as follows: The quoin is placed between the rail and the block, and then the wedge is slipped along on the projections D and E by the fingers of the printer pressing one way on the wedge and the other way on the plate F till the quoin is in contact with both the rail and the block. Then the screw is turned with a wrench till enough pressure is exerted thereby upon the rail and the block to rigidly hold the adjacent type in place in the frame of the form of which the rail is a part. The wedge is relied upon to do the first and most extensive part of the adjustment, and the screw is used to do the last and most powerful part thereof. The plate A may be omitted, and the head of the screw be pressed directly against the rail or the block, as the case may be; but I prefer to use that plate, and also to make it slightly concave, as shown in Fig. 2, though it may be entirely flat on its working-surface.

I claim as my invention—

1. The combination of the wedge A, the plate F, and the screw G, the screw operating at right angles to the most distant side of the wedge and at an oblique angle to the base of the plate F, all substantially as described.

2. The combination of the wedge A, the plate F, the screw G, and the plate H, all operating together substantially as hereinbefore set forth.

FRANCIS C. GRAVES.

Witnesses:
ALBERT H. WALKER,
RICHARD HARRY ROBERTS.